(12) United States Patent
Okamoto et al.

(10) Patent No.: US 6,726,762 B2
(45) Date of Patent: Apr. 27, 2004

(54) FINELY DIVIDED PIGMENTS AND COLORING COMPOSITIONS

(75) Inventors: Hisao Okamoto, Tokyo (JP); Yutaka Nakagawa, Tokyo (JP); Yoshiyuki Zama, Tokyo (JP); Koji Tsuchiya, Tokyo (JP); Shotoku Takami, Tokyo (JP); Yoshio Abe, Tokyo (JP); Michiei Nakamura, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/180,020

(22) Filed: Jun. 27, 2002

(65) Prior Publication Data

US 2003/0084820 A1 May 8, 2003

(30) Foreign Application Priority Data

Jun. 28, 2001 (JP) ........................................ 2001-196893

(51) Int. Cl.[7] .......................... C09D 5/00; C09D 11/00; C09C 3/00; C09F 9/00; G03G 9/00
(52) U.S. Cl. ................... 106/493; 106/31.6; 106/31.75; 106/31.77; 106/31.78; 106/31.8; 106/31.9; 106/401; 106/410; 106/494; 106/495; 106/496; 106/497; 106/498; 347/100; 347/112; 349/106; 427/162; 430/7
(58) Field of Search ............... 106/31.6, 31.75, 106/31.77, 31.78, 31.8, 31.9, 401, 410, 493–498; 347/100, 112; 349/106; 427/162; 430/7

(56) References Cited

U.S. PATENT DOCUMENTS

| | | | | |
|---|---|---|---|---|
| 4,492,750 A | * | 1/1985 | Law et al. | 430/494 |
| 4,886,972 A | * | 12/1989 | Nakai et al. | 250/504 R |
| 4,927,466 A | * | 5/1990 | Hays | 106/494 |
| 5,006,173 A | * | 4/1991 | Fath et al. | 106/410 |
| 5,944,883 A | * | 8/1999 | Saibara et al. | 106/31.86 |
| 6,190,818 B1 | * | 2/2001 | Ioannidis et al. | 430/135 |

FOREIGN PATENT DOCUMENTS

| | | | | |
|---|---|---|---|---|
| JP | 62-197463 A | * | 9/1987 | |
| JP | 63-050305 A | * | 3/1988 | |
| JP | 01-145306 A | * | 6/1989 | |
| JP | 04-132702 A | * | 5/1992 | |

* cited by examiner

*Primary Examiner*—Anthony J. Green
(74) *Attorney, Agent, or Firm*—Oblon, Spivak, McClelland, Maier & Neustadt, P.C.

(57) ABSTRACT

A finely divided pigment is formed of an aggregate of primary particles. A number of primary particles of not greater than 0.1 $\mu$m in particle size is at least 95% of an entire number of the primary particles, and a number of primary particles of greater than 0.1 $\mu$m in particle size is at most 5% of the entire number of the primary particles. The finely divided pigment can be produced by grinding a parent pigment (pre-division pigment) together with a water-soluble inorganic salt and a water-soluble organic solvent in a grinding machine at a temperature of from 30 to 90° C. for 2 to 6 hours under a load, and then removing the water-soluble inorganic salt and the water-soluble organic solvent. A coloring composition comprises a dispersing medium and the finely divided pigment dispersed in the dispersing medium. The coloring composition is, for example, an image recording agent for the ink-jet recording system, an image recording agent for the electronic printing or electrostatic recording system, or a coloring agent for forming color filter pixels.

13 Claims, No Drawings

FINELY DIVIDED PIGMENTS AND COLORING COMPOSITIONS

BACKGROUND OF THE INVENTION a) Field of the Invention

This invention relates to finely divided pigments, and has an object thereof the provision of finely divided pigments useful for various applications, for example, as pigments for printing inks (gravure inks, offset inks, flexographic inks, etc.), plastic colorants, pigment-type textile printing agents, pigments for paints, image recording agents, and pigments for image displaying. The term "pigment" as used herein means an aggregate of fine coloring particles, whereas the term "pigment particles" as used herein means "fine coloring articles making up a pigment". Further, the term "secondary particles" as used herein means particles formed by agglomeration of finely divided pigment particles (primary particles) and having greater particle sizes.

b) Description of the Related Art

Pigments have conventionally been used as coloring agents for paints, printing inks, plastics and the like. In each of these pigments, fine particles (primary particles) which make up the pigment have already undergone agglomeration, and the agglomerated particles (secondary particle) have particles sizes around 10 to 20 $\mu$m. A pigment formed of particles of such large particle sizes cannot be used as a coloring agent for paints or printing inks. Therefore, the pigment is used after mechanically milling or grinding it together with a paint vehicle or a printing ink varnish in a pigment dispersing machine, for example, a ball mill, sand mill, attritor, horizontal continuous disperser with tumbling medium contained therein, vertical continuous disperser with tumbling medium contained therein, kneader or three-roll mill such that particles making up the pigment are dispersed with particle sizes of from about 0.5 to 0.2 $\mu$m in the vehicle or varnish.

In applications where dyes have been employed as coloring agents to date, pigments have been finding increasing utility in recent years for their excellent lightfastness and waterproofness. These applications include, for example, inks for writing instruments, in which aqueous dyes or oil-soluble dyes have been used as coloring agents, and colorants for plastics, in which oil-soluble dyes have been used as coloring agents as transparency is required. Further, there are also increasing demands for pigments as coloring agents for LCD color filters, coloring agents for ink-jet recording inks and coloring agents for color toners.

For these applications, it is necessary to divide pigment-forming particles (pigment particles) as finely as possible (0.1 $\mu$m or smaller). As a method for finely dividing pigment particles, it is known to use a high-speed sand mill or the like. Further, to provide a colored article with transparency and vividness or sharpness, it is necessary to finely divide pigment particles and at the same time, to sift pigment particles to control their sizes (to make their particle size distribution narrower). Moreover, it is also important to evenly disperse the finely divided pigment particles in a vehicle and during storage of the dispersion, to provide the dispersion with stability such that the pigment particles remain in their finely divided form without undergoing agglomeration.

SUMMARY OF THE INVENTION

An object of the present invention is, therefore, to provide a finely divided pigment, which is usable not only as a coloring agent for paints, printing inks, plastics and the like but also as a coloring agent for LCD color filters, ink-jet recording inks, color toners and the like to obtain colored products having a transparent, vivid and sharp color hue and also properties such as excellent lightfastness, outstanding weatherability and superb heat resistance. Another object of the present invention is to provide a coloring composition comprising the finely divided pigment as a colorant.

To achieve the above-described objects, the present inventors have proceed with an extensive investigation. As a result, it has been found that irrespective of the kind of a pigment, the above-described objects can be achieved by finely dividing the pigment particles to obtain a particular particle size distribution, leading to the completion of the present invention In one aspect of the present invention, there is thus provided a finely divided pigment formed of an aggregate of primary particles, wherein a number of primary particles of not greater than 0.1 $\mu$m in particle size is at least 95% of an entire number of the primary particles, and a number of primary particles of greater than 0.1 $\mu$m in particle size is at most 5% of the entire number of the primary particles.

In another aspect of the present invention, there is also provided a process for producing the finely divided pigment, which comprises grinding a parent pigment together with a water-soluble inorganic salt and a water-soluble organic solvent in a grinding machine at a temperature of from 30 to 90° C. for 2 to 6 hours under a load, and then removing the water-soluble inorganic salt and the water-soluble organic solvent.

In a further aspect of the present invention, there is also provided a coloring composition comprising a dispersing medium and the finely divided pigment dispersed in the dispersing medium. The coloring composition may be an image recording agent for the ink-jet recording system, an image recording agent for the electronic printing or electrostatic recording system, or a coloring agent for forming color filter pixels.

In a further aspect of the present invention, there is also provided a process for coloring an article, which comprises using the coloring composition.

In a still further aspect of the present invention, there is also provided an image recording apparatus of the ink-jet recording system or the electronic printing or electrostatic recording system, comprising the image recording agent for the ink-jet recording system or the image recording agent according for the electronic printing or electrostatic recording system mounted as an image recording agent.

In a still further aspect of the present invention, there is also provided a process for manufacturing a color filter, which comprises forming a color pattern on a color filter substrate by using the coloring agent for forming color filter pixels.

In a yet further aspect of the present invention, there is also provided a color filter manufactured by the manufacturing process.

When the finely divided pigment according to the present invention is used as a coloring agent in plastics, pigment-type textile printing agents, printing inks, paints, especially metallic paints, or the like, the finely divided pigment exhibits, on colored products or articles, excellent dispersion and superb properties such as weatherability, lightfastness and heat resistance while retaining transparency, vividness and sharpness comparable with dyes. In addition, the finely divided pigment according to the present invention is also useful as a pigment in image recording agents for the ink-jet recording system, image recording agents for the electronic printing or electrostatic recording system and coloring agents for forming pixels on color filters.

DETAILED DESCRIPTION OF THE INVENTION AND PREFERRED EMBODIMENTS

The present invention will hereinafter be described in further detail based on certain preferred embodiments.

The finely divided pigment according to the present invention is characterized in that the number of primary particles of not greater than 0.1 μm in particle size is at least 95% of the entire number of the primary particles, and the number of primary particles of greater than 0.1 μm in particle size is at most 5% of the entire number of the primary particles. When fastness, such as heat resistance and weatherability, of the pigment is taken into consideration, the number of primary particles of not greater than 0.02 μm in particle size may preferably be at most 10% of the entire number of the primary particles. By finely dividing the pigment particles into such a particle size range, it is possible to provide a colored product with both a color hue having transparency, vividness and sharpness and excellent fastness such as heat resistance and weatherability. The term "number" as used herein means the number of all particles or the number of particles in a specific particle size range as counted under a transmission electron microscope as will be mentioned below.

Pigments to which the present invention is applicable include all pigments known to date. Preferred examples can include organic pigments such as soluble or insoluble azo pigments, high molecular azo pigments, quinacridone pigments, anthraquinone pigments, diketopyrrolopyrrole pigments, quinophthalone pigments, methine/azomethine pigments, phthalocyanine pigments, perylene pigments, perinone pigments, isoindolinone pigments and metal complex pigments.

Among the above-described pigments, those capable of exhibiting particularly excellent advantageous effects by finely dividing their particles can include: as yellow pigments, C.I. Pigment Yellow (hereinafter abbreviated as "PY")-74, PY-83, PY-93, PY-94, PY-95, PY-97, PY-109, PY-110, PY-120, PY-128, PY-138, PY-139, PY-147, PY-150, PY-151, PY-154, PY-155, PY-166, PY-175, PY-180, PY-181, PY-185, PY-191, etc.; as orange pigments, C.I. Pigment Orange (hereinafter abbreviated as "PO")-61, PO-64, PO-71, PO-73, etc.; as red pigments, C.I. Pigment Red (hereinafter abbreviated as "PR")-4, PR-5, PR-23, PR-48:2, PR-48:4, PR-57:1, PR-112, PR-122, PR-144, PR-146, PR-147, PR-150, PR-166, PR-170, PR-177, PR-184, PR-185, PR-202, PR-207, PR-214, PR-220, PR-221, PR-242, PR-254, PR-255, PR-264, PR-272, etc; as blue pigments, C.I. Pigment Blue (hereinafter abbreviated as "PB")-15:1, PB-15:2, PB-15:3, PB-15:4, PB-15:5, PB-15:6, PB-16, PB-17:1, PB-60, aluminum phthalocyanine blue, etc.; as green pigments, C.I. Pigment Green (hereinafter abbreviated as "PG")-7, PG-36, etc.; and as violet pigments, C.I. Pigment Violet (hereinafter abbreviated as "PV")-19, PV-23, PV-37, etc.

The particle sizes and number fractions of the particles making up the finely divided pigment, said particle sizes and number fractions characterizing the present invention, can be determined by observing the pigment particles at ×30,000 to ×100,000 magnification under a transmission electron microscope and counting the number of particles of not greater than 0.1 μm in particle size, the number of particles of greater than 0.1 μm in particle size and the number of particles of smaller than 0.02 μm in particle size among the whole particles in a field of view. This procedure is performed three times on samples of the same pigment. With respect to each of the samples, the numbers of particles in the above-described specific ranges are counted. The particle sizes and number fractions of the pigment particle are then calculated by averaging the results of the counting.

The finely divided pigment according to the present invention, which has the above-described number distribution of the fractions of primary particles, can be obtained by finely dividing a parent pigment (pre-division pigment) by a method specifically suited for the pigment. Some methods will hereinafter be described as examples. It should however be borne in mind that the present invention is not limited to these methods.

(1) A description will first be made of so-called solvent salt milling. According to this method, a parent pigment is charged together with a water-soluble inorganic salt, such as sodium chloride or sodium sulfate, and a water-soluble organic solvent, such as ethylene glycol, diethylene glycol or polyethylene glycol, in appropriate mixing proportions in a kneader. After the contents are kneaded for a predetermined time at a controlled temperature while applying a load to the contents to compress the same, the kneaded mixture is added to a heated aqueous solution of dilute sulfuric acid and is stirred. The kneaded mixture is collected by filtration, and is then washed with water to remove the water-soluble inorganic salt and the water-soluble organic solvent. The filtration residue is then dried by hot air or the like. Instead of this method, dry milling making use of a ball mill or an oscillating mill can also be used in a similar manner as described above. In this case, a grinding medium such as steel balls or steel rods is used, and if necessary, an inorganic salt can be used as a grinding aid. As the grinding aid, aluminum nitrate or the like can be mentioned in addition to the above-described sodium chloride and sodium sulfate.

Grinding conditions for obtaining the finely divided pigment according to the present invention, which has the above-described number distribution of the fractions of primary particles, differ depending on the kind of the pigment. Concerning the proportions of the water-soluble inorganic salt, parent pigment and water-soluble organic solvent, the kneading time and the processing temperatures, it is, therefore, important to determine optimal conditions and optimal proportions depending upon the kind of the pigment and to conduct the finely dividing processing under the conditions so determined.

When the contents of the grinding apparatus are pressed during the grinding of the pigment, substantial frictional heat is generated under strong shear force so that particles which make up the pigment may undergo crystal growth into greater particles. When pressing as described above, it is thus necessary to adequately cool the grinding machine to avoid heating of its contents or to add a crystal growth inhibitor for the pigment particles such as a solid resin which dissolves at least partially in the water-soluble organic solvent. This makes it possible to obtain the finely divided pigment according to the present invention.

Described in more detail, when a parent pigment formed of particles having primary particle sizes of from 0.1 to 0.8 μm or so is used as a raw material for the finely divided pigment according to the present invention, it is desired to use the water-soluble inorganic salt in a proportion 2 to 10 times by weight, preferably 3 to 6 times by weight as much as the parent pigment and the water-soluble organic solvent in a proportion 0.5 to 2.0 times by weight, preferably 1.0 to 1.5 times by weight as much as the parent pigment and to control the temperature of the contents of the grinding machine or kneader at 30 to 90° C. The required grinding or kneading time may range generally from 2 to 6 hours, although it differs depending upon the combination of the proportions of the inorganic salt and water-soluble organic solvent and the temperature of the contents. Further, the finely divided pigment according to the present invention, which has a desired particle size distribution, can be obtained in a shorter time as the proportion of the inorganic salt to be used becomes greater and as the processing temperature becomes lower.

(2) There is also a method called "acid pasting". According to this method, a parent pigment is dissolved in a good solvent for the pigment, such as sulfuric acid or polyphosphoric acid, and the resulting solution is poured into a poor solvent such as water to make pigment particles deposit or precipitate. The finely divided pigment according to the present invention can be obtained only by thoroughly washing the thus-obtained pigment with water. However, the objects of the present invention can be more surely achieved by conducting treatment of the pigment particles with an adequate organic solvent or the like and if necessary, making combined use of solvent salt milling, which has been described above under (1), such that the particle sizes of the pigment particles are controlled into a narrower range.

(3) Especially for azo pigments, a method is also known as disclosed in JP 60-36224 B or JP 3055673 B. Described specifically, upon subjecting the diazonium salt of a specific diazotizable aromatic amine and a coupling component to a coupling reaction, at least two kinds of coupling components are used to produce a finely divided pigment. This is a method called "co-coupling", which is specific to azo pigments. In some instances, the finely divided pigment according to the present invention can be obtained as desired only by this method. Preferably, however, combined use of the solvent salt milling method described above under (1) is a surer method for obtaining the finely divided pigment according to the present invention.

The finely divided pigment according to the present invention obtained as described above has a color hue excellent in vividness, sharpness and transparency on or in a colored product and further, exhibits excellent fastness properties such as outstanding weatherability, superb heat resistance and excellent solvent resistance on or in the colored product.

The finely divided pigment according to the present invention can be used inter alia as a coloring agent for inks containing vehicles such as resins, paints, pigment-type textile printing agents, fibers, and molded or otherwise formed plastic products, a coloring agent for image recording, and a coloring agent for image displaying. Upon employment for an application, the finely divided pigment according to the present invention is used as a coloring composition with the pigment dispersed in a dispersing medium which is commonly used in the application. In the composition, the primary particles which make up the finely divided pigment exist as independent particles (primary particles) or slightly agglomerated particles (secondary particles). It is desired to prepare the coloring composition such that the average particle size of the pigment particles dispersed in the coloring composition is reduced generally to 0.2 $\mu$m or smaller, preferably to 0.15 $\mu$m or smaller.

It is well known that finely divided pigment particles generally become susceptible to agglomeration in a dispersing medium when their surface energy increases extremely. By subjecting the finely divided pigment particles to surface treatment with a surfactant or a pigment derivative (a compound obtained by introducing desired substituent group(s) into a compound which has the same chemical structure as the pigment but has not been formed into a pigment) or by adding one or more of various dispersants to the dispersing medium such as a vehicle with the pigment dispersed therein, the pigment particles can be prevented from agglomeration to avoid an increase in the viscosity of a pigment dispersion (a liquid mixture with the pigment dispersed in the dispersing medium) and also to assure the stability of dispersion of the pigment particles.

Upon preparing the coloring composition by using the finely divided pigment according to the present invention, one or more of various pigment derivatives can be used in combination to improve the dispersibility of the pigment particles and the flowability of the pigment dispersion although the finely divided pigment according to the present invention can be used singly. Illustrative of pigment derivatives usable in the present invention are anthraquinone compound derivatives with aliphatic N-substituted alkylamine residual groups introduced into anthraquinone compounds as disclosed in JP 11-189732 A and JP 2000-193817 A; and phthalocyanine compound derivatives with aliphatic N-substituted alkylamine residual groups introduced into phthalocyanine compounds as disclosed in JP 2000-136333 A. No particular limitation is imposed on the proportion of such a pigment derivative to be used. In general, however, the pigment derivative may be used in a proportion of from 0.5 to 50 wt. %, with a proportion of from 1 to 30 wt. % being preferred, both based on the finely divided pigment according to the present invention.

In the present invention, a dispersant can be used in place of the above-described pigment derivative or together with the pigment derivative as needed to improve the dispersibility of the pigment particles in the dispersing medium. As the dispersant, any one or more of conventionally known dispersants can be used. Illustrative are polyester oligomers having aliphatic hydroxycarboxylic acid residual groups as disclosed in JP 7-96654 B and JP 7-207178 A; organosiloxane polymers (e.g., "KP341", trade name, product of Shin-Etsu Chemical Co., Ltd.); (meth) acrylic acid (co)polymers (e.g., "Polyflow No. 75", "Polyflow No. 90" and "Polyflow No. 95", trade names, products of Kyoei Yushi Kagaku Kogyo K.K.); cationic surfactants (e.g., "W001", trade name, product of Yusho K.K.); nonionic surfactants, for example, polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate, and sorbitan fatty acid esters; anionic surfactants (e.g., "W004", "W005" and "W017", trade names, product of Yusho K.K.); various SOLSPERSE dispersants such as "SOLSPERSE 3000", "SOLSPERSE 5000", "SOLSPERSE 9000", "SOLSPERSE 12000", "SOLSPERSE 13240", "SOLSPERSE 13940", "SOLSPERSE 17000", "SOLSPERSE 20000", "SOLSPERSE 24000", "SOLSPERSE 26000" and "SOLSPERSE 28000", trade names, products of Zeneca Inc.; and "ISONET S-20", trade name, product of Sanyo Chemical Industries, Ltd. No particular limitation is imposed on the proportion of the dispersant to be used. In general, however, the dispersant may be used in a proportion of from 0.1 to 50 wt. %, with a proportion of from 0.1 to 20 wt. % being preferred, both based on the finely divided pigment according to the present invention.

When using the finely divided pigment according to the present invention as a coloring composition with the pigment dispersed in a dispersing medium for a particular application, any one of dispersing media commonly employed in the particular application can be used as the dispersing medium, and no particular limitation is imposed on the dispersing medium. Further, no particular limitation is imposed on the proportion of the finely divided pigment in the coloring composition, and the finely divided pigment can be used in similar proportions as conventionally known proportions in respective applications. In general, however, the content of the finely divided pigment in the coloring composition may range from 1 to 60 wt. % or so although it varies depending on the application.

The dispersing medium will now be exemplified. For example, a dispersing medium for paints can be either solid or liquid. As a liquid dispersing medium, water, a water-hydrophilic organic solvent mixture, or an organic solvent can be used. As the organic solvent, aliphatic hydrocarbons, alicyclic hydrocarbons, aromatic hydrocarbons, halogenated hydrocarbons, esters, ketones, glycol ethers, alcohols and the like are used, for example, and no particular limitation is imposed thereon.

When a vehicle for paints, a varnish for printing inks or a vehicle for coating formulations is used as a dispersing medium, a conventionally known, oily or aqueous dispersing medium is used depending on each application. Examples of the dispersing medium can include alkyd resins of long oil length, medium oil length or short oil length, modified alkyd resins such as phenol-modified alkyd resins and styrenated alkyd resins, aminoalkyd resins, oil-free alkyd resins, baking acrylic resins, acrylic lacquer resins, acrylic polyol resins, polyester resins, epoxy resins, butylated melamine resin, methylated melamine resin, urea-melamine resin, phenol resin, rosin-modified phenol resin, rosin-modified maleic acid resin, polyurethane resins, styrene resin, styrene-acrylic acid or acrylic acid ester copolymer resins, styrene-diene copolymer resins, vinyl chloride copolymer resins, polyvinyl acetate resin, vinyl acetate copolymer resins, ethylene-vinyl acetate copolymer resin, ethylene-vinyl acetate copolymer resin, butyral resin, petroleum resins, rosin esters, modified resins such as maleic rosin esters, drying oils, and boiled oils.

Examples of solid dispersing media (for example, molded or otherwise formed products) can include various plastics such as polyethylene resin, polypropylene resin, polyvinyl chloride resin, styrene resin, acrylonitrile-styrene copolymer resin, polyester resins, acrylic resins, methacrylic acid or methacrylic acid ester-styrene copolymer resins, and ABS resin. When fibers are a dispersing medium, illustrative are pre-spinning fiber materials such as nylon, polyethylene terephthalate, polybutylene terephthalate, polypropylene and polyimides.

As dispersing media in ink-jet recording inks for image recording, there are water and mixtures of water and water-soluble organic solvents. Usable examples of such water-soluble organic solvents can include alcohols (e.g., methanol, ethanol, and isopropyl alcohol); polyhydric alcohols (e.g., ethylene glycol, diethylene glycol, polyethylene glycol, and glycerin); alkyl ethers of polyhydric alcohols (e.g., ethyleneglycol monomethylether, and ethyleneglycol monobutylether); amines (e.g., diethanolamine, and ethanolamine); and heterocyclic compounds (e.g., N-methyl-2-pyrrolidone, and sulfolane). In addition, the above dispersing media ink-jet recording inks can include water-soluble resins (e.g., acrylic resins, methacrylic acid-styrene copolymer resins, polyester resins, polyamide resins, and polyurethane resins, or mixtures of thereof).

Further, as examples of dispersing media in (image recording) developers or toners for electrophotographic copying machines, polystyrene resin, styrene-(meth)acrylic acid ester copolymer resins, styrene-butadiene copolymer resin, polyester resins and epoxy resins are used together with various additives. In general, dispersing media for use in (image displaying) coloring agents for LCD color filters are each composed of an organic solvent, which contains a film-forming resin, and a pigment dispersant. Examples of resins usable in these dispersing media can include photosensitive cyclized rubber resins, photosensitive phenol resins, photosensitive polyacrylate resins, photosensitive polyamide resins, photosensitive polyimide resins, unsaturated polyester resins, polyester-acrylate resins, polyepoxy-acrylate resins, polyurethane-acrylate resins, polyether-acrylate resins, and polyol-acrylate resins. As reactive diluents, various monomers can be added.

The present invention will next be described more specifically based on Examples and Comparative Examples, in which the designations "part" or "parts" and "%" are each on a weight basis unless otherwise specifically indicated. Further, each "%" in each particle size distribution of pigment particles means "percentage in terms of the number of particles". The fractions (percentages in terms of the number of particles) of pigment particles in each particle size distribution are based on the numbers of the pigment particles in the fractions observed under a transmission electron microscope.

EXAMPLE 1

(Finely Divided Pigment of PY-95)

A polyazo-type yellow pigment (PY-95) (particle sizes: 0.15 to 0.6 $\mu$m, 100 parts), sodium chloride (400 parts) and diethylene glycol (130 parts) were charged in a kneader equipped with a pressure cover, and were provisionally kneaded until an evenly-moistened mass was formed in the kneader. The pressure cover was then closed and, while pressing the contents under a pressure of 6 kg/cm$^2$, kneading/grinding was initiated. The kneading/grinding processing was conducted for 4 hours while controlling the temperature and flow rate of cooling water such that the temperature of the contents remained at 40 to 45° C.

The thus-obtained ground mixture was added to a 2% aqueous solution of sulfuric acid (3,000 parts), which had been heated to 80° C., and was stirred for 1 hour. The ground mixture was then collected by filtration, and was washed with water to remove the sodium chloride and diethylene glycol. The filtration residue is then dried for 24 hours in a hot-air dryer of 80° C. to afford a finely divided yellow pigment (Y-1).

As a result of an observation under a transmission electron microscope (TEM), the thus-obtained, finely divided yellow pigment was found to consist mainly of primary particles of 0.02 to 0.1 $\mu$m in particle size and to have a BET specific surface area of 73 m$^2$/g. A TEM picture was subjected to an image analysis to determine the particle size distribution. Particles of smaller than 0.02 $\mu$m in particle size accounted for 8.6% of the entire number of the particles, particles of from 0.02 to 0.1 $\mu$m in particle size accounted for 90.9% of the entire number of the particles, and particles of greater than 0.1 $\mu$m in particle size accounted for 0.5% of the entire number of the particles.

EXAMPLE 2

(Finely Divided Pigment of PR-122)

A 2,9-dimethylquinacridone pigment (PR-122) (particle sizes: 0.08 to 0.25 $\mu$m, 100 parts), sodium chloride (500 parts) and diethylene glycol (130 parts) were charged in a kneader equipped with a pressure cover, and were provisionally kneaded until an evenly-moistened mass was formed in the kneader. The pressure cover was then closed and, while pressing the contents under a pressure of 6 kg/cm$^2$, kneading/grinding was initiated. The kneading/grinding processing was conducted for 4 hours while controlling the temperature and flow rate of cooling water such that the temperature of the contents remained at 40 to 45° C.

The thus-obtained ground mixture was added to a 2% aqueous solution of sulfuric acid (3,000 parts), which had been heated to 80° C., and was stirred for 1 hour. The ground mixture was then collected by filtration, and was washed with water to remove the sodium chloride and diethylene glycol. The filtration residue is then dried for 24 hours in a hot-air dryer of 80° C. to afford a finely divided red pigment (R-1)

As a result of a TEM observation, the thus-obtained, finely divided pigment was found to consist mainly of primary particles of 0.02 to 0.1 μm in particle size and to have a BET specific surface area of 79 m$^2$/g. A TEM picture was subjected to an image analysis to determine the particle size distribution. Particles of smaller than 0.02 μm in particle size accounted for 8.3% of the entire number of the particles, particles of from 0.02 to 0.1 μm in particle size accounted for 87.2% of the entire number of the particles, and particles of greater than 0.1 μm in particle size accounted for 4.5% of the entire number of the particles.

EXAMPLE 3

(Finely Divided Pigment of PB-15:3)

A copper phthalocyanine blue pigment (PB-15:3) (particle sizes: 0.1 to 0.3 μm, 100 parts), sodium chloride (500 parts) and diethylene glycol (130 parts) were charged in a kneader equipped with a pressure cover, and were provisionally kneaded until an evenly-moistened mass was formed in the kneader. The pressure cover was then closed and, while pressing the contents under a pressure of 6 kg/cm$^2$, kneading/grinding was initiated. The kneading/grinding processing was conducted for 4 hours while controlling the temperature and flow rate of cooling water such that the temperature of the contents remained at 40 to 45° C.

The thus-obtained ground mixture was added to a 2% aqueous solution of sulfuric acid (3,000 parts), which had been heated to 80° C., and was stirred for 1 hour. The ground mixture was then collected by filtration, and was washed with water to remove the sodium chloride and diethylene glycol. The filtration residue is then dried for 24 hours in a hot-air dryer of 80° C. to afford a finely divided blue pigment (B-1).

As a result of a TEM observation, the thus-obtained, finely divided pigment was found to consist mainly of primary particles of 0.02 to 0.1 μm in particle size and to have a BET specific surface area of 77 m$^2$/g. A TEM picture was subjected to an image analysis to determine the particle size distribution. Particles of smaller than 0.02 μm in particle size accounted for 8.3% of the entire number of the particles, particles of from 0.02 to 0.1 μm in particle size accounted for 89.6% of the entire number of the particles, and particles of greater than 0.1 μm in particle size accounted for 2.1% of the entire number of the particles.

EXAMPLE 4

(Finely Divided Pigment of PG-36)

A copper phthalocyanine green pigment (PG-36) (particle sizes: 0.07 to 0.15 μm, 100 parts), sodium chloride (500 parts) and diethylene glycol (130 parts) were charged in a kneader equipped with a pressure cover, and were provisionally kneaded until an evenly-moistened mass was formed in the kneader. The pressure cover was then closed and, while pressing the contents under a pressure of 6 kg/cm$^2$, kneading/grinding was initiated. The kneading/grinding processing was conducted for 4 hours while controlling the temperature and flow rate of cooling water such that the temperature of the contents remained at 40 to 45° C.

The thus-obtained ground mixture was added to a 2% aqueous solution of sulfuric acid (3,000 parts), which had been heated to 80° C., and was stirred for 1 hour. The ground mixture was then collected by filtration, and was washed with water to remove the sodium chloride and diethylene glycol. The filtration residue is then dried for 24 hours in a hot-air dryer of 80° C. to afford a finely divided green pigment (G-1).

As a result of a TEM observation, the thus-obtained, finely divided pigment was found to consist mainly of primary particles of 0.02 to 0.1 μm in particle size and to have a BET specific surface area of 71 m$^2$/g. A TEM picture was subjected to an image analysis to determine the particle size distribution. Particles of smaller than 0.02 μm in particle size accounted for 9.8% of the entire number of the particles, particles of from 0.02 to 0.1 μm in particle size accounted for 86.6% of the entire number of the particles, and particles of greater than 0.1 μm in particle size accounted for 3.6% of the entire number of the particles.

EXAMPLE 5

(Finely Divided Pigment of PV-23)

A dioxadine violet pigment (PV-23) (particle sizes: 0.06 to 0.18 μm, 100 parts), sodium chloride (500 parts) and diethylene glycol (130 parts) were charged in a kneader equipped with a pressure cover, and were provisionally kneaded until an evenly-moistened mass was formed in the kneader. The pressure cover was then closed and, while pressing the contents under a pressure of 6 kg/cm$^2$, kneading/grinding was initiated. The kneading/grinding processing was conducted for 4 hours while controlling the temperature and flow rate of cooling water such that the temperature of the contents remained at 40 to 45° C.

The thus-obtained ground mixture was added to a 2% aqueous solution of sulfuric acid (3,000 parts), which had been heated to 80° C., and was stirred for 1 hour. The ground mixture was then collected by filtration, and was washed with water to remove the sodium chloride and diethylene glycol. The filtration residue is then dried for 24 hours in a hot-air dryer of 80° C. to afford a finely divided violet pigment (V-1).

As a result of a TEM observation, the thus-obtained, finely divided pigment was found to consist mainly of primary particles of 0.02 to 0.1 μm in particle size and to have a BET specific surface area of 69 m$^2$/g. A TEM picture was subjected to an image analysis to determine the particle size distribution. Particles of smaller than 0.02 μm in particle size accounted for 8.4% of the entire number of the particles, particles of from 0.02 to 0.1 μm in particle size accounted for 88.0% of the entire number of the particles, and particles of greater than 0.1 μm in particle size accounted for 3.6% of the entire number of the particles.

COMPARATIVE EXAMPLE 1

(Excessively Small Particle Size)

A finely divided pigment (Y-1') was obtained by the same procedure as in Example 1 except that the kneading/grinding time was increased to 8 hours. As a result of a TEM observation, the thus-obtained pigment was found to consist mainly of primary particles of 0.01 to 0.6 μm in particle size and to have a BET specific surface area of 86 m²/g. A TEM picture was subjected to an image analysis to determine the particle size distribution. Particles of smaller than 0.02 μm in particle size accounted for 19.6% of the entire number of the particles, particles of from 0.02 to 0.06 μm in particle size accounted for 69.5% of the entire number of the particles, particles of from 0.06 to 0.1 μm in particle size accounted for 10.2% of the entire number of the particles, and particles of greater than 0.1 μm in particle size accounted for 0.7% of the entire number of the particles.

COMPARATIVE EXAMPLE 2

(Excessively Large Particle Size)

A finely divided pigment (Y-2') was obtained by the same procedure as in Example 1 except that the temperature of the contents was controlled at 60 to 65° C. and the kneading/grinding time was changed to 7 hours. As a result of a TEM observation, the thus-obtained pigment was found to consist mainly of primary particles of 0.02 to 0.1 μm in particle size and to have a BET specific surface area of 65 m²/g. A TEM picture was subjected to an image analysis to determine the particle size distribution. Particles of smaller than 0.02 μm in particle size accounted for 0.2% of the entire number of the particles, particles of from 0.02 to 0.06 μm in particle size accounted for 12.5% of the entire number of the particles, particles of from 0.06 to 0.1 μm in particle size accounted for 72.6% of the entire number of the particles, and particles of greater than 0.1 μm in particle size accounted for 14.7% of the entire number of the particles.

EXAMPLES 6–14

In a similar manner as in Examples 1–5 described above, finely divided pigments according to the present invention having BET specific surface areas and particle size distributions shown in Table 1 were prepared. Physical properties of the finely divided pigments of the individual Examples and Comparative Examples are summarized in Table 1.

TABLE 1

| Ex. | Parent pigment | Finely divided pigment | Processing time (hr) | BET specific surface area (m²/g) | Particle size distribution (%) by image analysis (particle size d: μm) | | |
|---|---|---|---|---|---|---|---|
| | | | | | d < 0.02 | 0.02 ≤ d ≤ 0.1 | d > 0.1 |
| 1 | PY-95 | Y-1 | 4 | 73 | 8.6 | 90.9 | 0.5 |
| 2 | PR-122 | R-1 | 4 | 79 | 8.3 | 87.2 | 4.5 |
| 3 | PB-15:3 | B-1 | 4 | 77 | 8.3 | 89.6 | 2.1 |
| 4 | PG-36 | G-1 | 4 | 71 | 9.8 | 86.6 | 3.6 |
| 5 | PV-23 | V-1 | 4 | 69 | 8.4 | 88.0 | 3.6 |
| 6 | PY-138 | Y-2 | 5 | 72 | 9.6 | 86.6 | 3.8 |
| 7 | PY-154 | Y-3 | 4 | 69 | 7.8 | 89.7 | 2.5 |
| 8 | PY-180 | Y-4 | 5 | 72 | 7.7 | 90.3 | 2.0 |
| 9 | PR-57:1 | R-2 | 3 | 69 | 7.1 | 88.6 | 4.3 |
| 10 | PR-177 | R-3 | 5 | 88 | 8.2 | 90.3 | 1.5 |
| 11 | PR-254 | R-4 | 4 | 78 | 1.6 | 97.9 | 0.5 |
| 12 | PB-15:6 | B-2 | 4 | 75 | 2.3 | 96.8 | 0.9 |
| 13 | Aluminum phthalocyanine | B-3 | 6 | 79 | 3.2 | 95.5 | 1.3 |
| 14 | PV-19 | V-2 | 5 | 74 | 2.2 | 95.2 | 2.6 |
| Comp. Ex. 1 | PY-95 | Y-1' | 8 | 86 | 19.6 | 79.7 | 0.7 |
| Comp. Ex. 2 | PY-95 | Y-2' | 7 | 65 | 0.2 | 85.1 | 14.7 |

EXAMPLE 15

(Tests on Paints)

The three kinds of finely divided pigments, which had been obtained in Example 1 and Comparative Examples 1 and 2, were separately dispersed in paint conditioners for 90 minutes in accordance with the following formulation to prepare deep color paints, respectively. The tinting power, transparency and weatherability of each of the paints were determined by the below-described methods. The results are shown in Table 2.

| | |
|---|---|
| Finely divided pigment of PY-95 (Y-1, Y-1' or Y-2') | 1.5 parts |
| "SUPERBECKAMINE J-820"* | 8.5 parts |
| "PHTHALKYD 133-60"** | 17.0 parts |
| Xylene/1-butanol mixed solvent (2/1 by weight ratio) | 5.0 parts |

*Trade name for a butylated melamine resin, product of Dainippon Ink & Chemicals, Incorporated.
**Trade name for a short oil length alkyd resin of coconut oil, product of Hitachi Chemical Company, Ltd.

(1) Tinting Power

Each deep color paint was diluted with a white paint, which contained titanium oxide, such that the ratio of the finely divided pigment (Y-1, Y-1' or Y-2') to titanium white became 1:20 (weight ratio). Using an applicator (6 mil), the diluted paint was applied onto a sheet of coated paper. After the diluted paint was baked at 140° C. for 30 minutes, the tinting power of the resulting coating was determined by the naked eye. Determination result were indicated by index numbers as compared with the tinting power of the "Y-1"-containing diluted paint taken as 100.

(2) Transparency

Each deep color paint was applied onto a glass plate by an applicator (6 mil). After the deep color paint was baked at 140° C. for 30 minutes, the transparency of the resulting coating was ranked by the naked eye.

Ranking results were indicated in accordance with the following ranking standard:

A: High transparency

B: Translucent

C: Opaque (3) Weatherability

The deep color paints and light color paints, each of which had been obtained by diluting the corresponding deep color paint with the white paint such that the ratio of the corresponding, finely divided pigment to titanium white became 1:20 (weight ratio), were each separately diluted with a thinner to a sprayable viscosity (14 seconds as measured by No. 4 Ford cup) and then spray-coated onto a primed steel panel by an air spray gun. After the color coated plate was baked at 140° C. for 30 minutes, the coated surface was exposed to artificial sunlight for 500 hours under a sunshine weatherometer (manufactured by Suga Test Instruments Co., Ltd.). A color difference ΔE from an unexposed coated plate was measured by "COLORCOM C. SPECTROPHOTOMETER" (trade name, manufactured by Dainichiseika Color & Chemicals Mfg. Co., Ltd.). Measurement results are shown in Table 2.

TABLE 2

| Pigment | Y-1 | Y-1' | Y-2' |
|---|---|---|---|
| Tinting power | 100 | 112 | 88 |
| Transparency | A | A | B |
| Weatherability (ΔE) | | | |
| Deep color | 1.5 | 2.5 | 1.4 |
| Light color | 5.7 | 8.1 | 5.4 |

EXAMPLE 16

(Paint)

A paint was prepared by dispersing individual components of the following formulation for 90 minutes in a paint conditioner.

| | |
|---|---|
| Aluminum pigment ("7620NS", trade name, product of Toyo Aluminum K.K.) | 28 parts |
| Finely divided pigment (R-3) obtained in Example 10 | 2 parts |
| Acrylic varnish (solid content: 60%) | 82 parts |
| Melamine varnish (solid content: 60%) | 34 parts |
| "SOLVESSO 100"/butyl acetate mixed solvent (7/3 by weight ratio) | 30 parts |

The thus-obtained paint was diluted with a thinner to a sprayable viscosity (14 seconds as measured by No. 4 Ford cup) and then spray-coated onto a primed steel panel by an air spray gun. After the thus-coated plate was dried for 10 minutes, coating of a clear lacquer (acrylic melamine) was conducted by an air spray gun. Subsequent to drying for 15 minutes at room temperature, the coatings were baked and cured at 140° C. for 30 minutes to prepare a steel panel. The thus-obtained plate with a red metallic coating applied thereon presented a vivid and transparent hue.

Similarly, plates with metallic coatings applied thereon were also prepared by using the finely divided yellow pigment (Y-3) obtained in Example 7 and the finely divided blue pigment (B-1) obtained in Example 3, respectively. They were panels with vivid and transparent, yellow and blue metallic coatings applied thereon, respectively. Those plates with the red, yellow and blue metallic coatings applied thereon, respectively, were excellent in weatherability, and also gave good results in a bleeding test conducted by a commonly-employed method.

EXAMPLE 17

(Printing to Woven Fabric)

A carboxyl-containing ethyl acrylate-styrene-acrylic acid (60:36:4(%)) copolymer latex (solid content 40%) (20 parts), a multi-branched polycarbodiimide crosslinking agent (solid content: 20%) (5 parts), water (10 parts) and an aqueous solution of polyoxyethylene alkyl phenyl ether (solid content: 20%) (5 parts) were stirred into a solution. While stirring the solution in a homomixer, mineral terpene (55 parts) was gradually added to prepare an o/w emulsion. Added to the emulsion was an aqueous dispersion prepared by dispersing the finely divided yellow pigment (Y-4), which had been obtained in Example 8, with a nonionic surfactant in water(pigment content: 20%) (5 parts). The resulting mixture was thoroughly mixed to prepare a resin-based textile-printing yellow pigment agent.

A cotton knit fabric was printed with the resin-based textile-printing yellow pigment agent on a screen printing machine. The thus-printed fabric was dried at room temperature to obtain a printed fabric of a yellow color, which was excellent in various fastness properties such as dry/wet crockfastness, washfastness and dry cleaning fastness, was soft and was vivid in color production.

In a similar manner, were prepared a resin-based textile-printing red pigment agent from the finely divided red pigment (R-2) obtained in Example 9, a resin-based textile-printing blue pigment agent from the finely divided blue pigment (B-1) obtained in Example 3, and a resin-based textile-printing green pigment agent from the finely divided green pigment (G-1) obtained in Example 4.

Using those textile-printing agents, cotton knit fabrics were printed with the resin-based textile-printing red pigment agent, the resin-based textile-printing blue pigment agent and the resin-based textile-printing green pigment agent, respectively, on a screen printing machine. The thus-printed fabrics were dried at room temperature to obtain printed fabrics of a red color, a blue color and a green color, which were excellent in various fastness properties such as dry/wet crockfastness, washfastness and dry cleaning fastness, were soft and were vivid in color production.

EXAMPLE 18

(Press-Formed Plastic Products)

The finely divided red pigment (R-1) (0.5 part) obtained in Example 2 and "ALKENE 200P" (trade name for an alkylbenzene plasticizer, product of Nippon Petrochemical Co., Ltd.) were kneaded. The kneaded mixture and a polyvinyl chloride resin compound (50 parts) were combined together and then kneaded at 155 to 160° C. for 3 minutes through 6-inch rolls to form a sheet. The sheet was press-formed at 170° C. under a pressure of 50 kg/cm$^2$ into a 5-mm thick sheet. The thus-formed sheet was colored in a transparent pure red color. Even after a white vinyl chloride resin sheet was kept laid over the colored sheet at 50° C. under a pressure of 10 kg/cm$^2$ for 24 hours, no migration of the pigment was observed.

In a similar manner, were formed colored polyvinyl chloride sheets from the finely divided yellow pigment (Y-4) obtained in Example 8 and the finely divided blue pigment (B-3) obtained in Example 13, respectively. The thus-formed sheets were colored in transparent pure red and blue colors, respectively. Even after white vinyl chloride resin sheets were kept laid over the colored sheets, respectively, at 50° C. under a pressure of 10 kg/cm² for 24 hours, no migration of the pigments was observed.

EXAMPLE 19

(Molded Plastic Products)

The finely divided blue pigment (B-1) (5 parts) obtained in Example 3 was mixed with polyethylene (1,000 parts), followed by the injection molding at 250° C. into a molded product. The molded product was evenly colored in a transparent blue color.

In a similar manner, molded polyethylene products were obtained from the finely divided red pigment (R-4) obtained in Example 11 and the finely divided yellow pigment (Y-4) obtained in Example 6, respectively. The molded polyethylene products were evenly colored in transparent red and yellow colors, respectively.

EXAMPLE 20

(Fibers)

The finely divided violet pigment (V-1) (1 part) obtained in Example 5 and polyethylene terephthalate resin pellets (200 parts) were mixed, and by a dry spinning machine controlled at temperatures of from 290 to 300° C., were then spun into 3-denier fibers at a residence time of 8 minutes. Without any clogging at a spinneret, polyester fibers excellent in transparency and vividness were obtained. A bundle of those fibers was held between two white polyester sheets, and was then subjected to heat treatment at 120° C. under a pressure of 20 kg/cm² for 2 hours. No migration of the pigment to the white polyester sheets was observed.

In a similar manner, polyester fibers were formed from the finely divided violet pigment (V-2) obtained in Example 14, the finely divided yellow pigment (Y-2) obtained in Example 6 and the finely divided blue pigment (B-3) obtained in Example 13, respectively. Those polyester fibers were all excellent in transparency and vividness. No migration of the pigments to the white polyester sheets was observed.

EXAMPLE 21

(Printing Inks)

The finely divided red pigment (R-1) (14 parts) obtained in Example 2 and "SOLSPERSE 24000" (trade mark for a polyester dispersant, product of Zeneca Inc.) (0.1 part) were added to limed rosin varnish (86 parts) (solid content: 40%). Using a paint conditioner, the finely divided red pigment was dispersed to prepare a gravure ink (100 parts). Using that ink, gravure printing was performed. As a result, a print of a red color having a vivid color hue and excellent gloss was obtained.

In a similar manner, gravure inks were obtained from the finely divided yellow pigment (Y-3) obtained in Example 7 and the finely divided blue pigment (B-1) obtained in Example 3, respectively. Using those gravure inks, gravure printing was performed, respectively. As a result, a print of a yellow color and a print of a blue color, each of which had a vivid color hue and excellent gloss, were obtained.

EXAMPLE 22

(Ink-Jet Recording Inks)

Prepared was an aqueous pigment dispersion, which was composed of the finely divided blue pigment (B-1) (5 parts), a styrene-acrylate-methacrylic acid diethanolamine salt copolymer (3 parts), ethylene glycol (22 parts), glycerin (8 parts) and water (62 parts). Coarse particles of the pigment, which had not been successfully dispersed, were removed by an ultracentrifuge to obtain a water-based cyan ink for ink-jet recording. Using that cyan ink, image information was printed by an on-demand ink-jet printer. An image of a vivid blue color was obtained.

In a similar manner, a yellow ink-jet recording ink, a magenta ink-jet recording ink and a black ink-jet recording ink were prepared from the finely divided yellow pigment (Y-1), the finely divided red pigment (R-2) and a carbon black pigment (C.I. Pigment Black 7), respectively. Using those inks and the above-described cyan ink-jet recording ink, full color printing of four colors was performed by a full color ink-jet printer. As a result, a vivid, full-color image was obtained. The image showed excellent fastness properties including lightfastness.

EXAMPLE 23

(Color Filters)

| | |
|---|---|
| Finely-divided green pigment (G-1) of Example 4 | 100 parts |
| Benzyl methacrylate/methacrylic acid/ 2-hydroxyethyl methacrylate copolymer (60/20/20 by molar ratio) (weight average molecular weight: 30,000) | 100 parts |
| Cyclohexane | 140 parts |
| Propylene glycol monomethyl ether acetate | 160 parts |

After the above components were premixed in a paint conditioner, propylene glycol monomethyl ether acetate was added such that the concentration of the pigment became 15%. As a pigment dispersant, "Disperbyk-163" (trade name for a block copolymer-based pigment dispersant) was added in a proportion of 20% based on the pigment. The pigment was then dispersed by "DYNOMIL" (trade name for a dispersing machine, manufactured by Shinmaru Enterprise Corporation).

The dispersion so obtained was applied onto a glass substrate, and its transmittance, contrast ratio, heat resistance and light fastness were ranked. As a result, a red color filter excellent in all physical properties was obtained. The above-described finely divided red pigment was therefore found to be suitable as a pigment for red color filters.

EXAMPLE 24

(Dry Developers for Electrophotography)

By a high-speed mixer, bisphenol polyester resin powder was premixed the finely divided yellow pigment (Y-1), the finely divided red pigment (R-2), the finely divided blue pigment (B-1) and a carbon black pigment (C.I. Pigment Black 7), respectively. The resulting mixtures were separately kneaded to sufficient extent by a heated three-roll mill. After cooling, they were separately ground coarsely to obtain, as readily-dispersible processed products, coarsely ground, yellow, red, blue and black powders which contained the corresponding, finely dispersed pigments at 30% concentrations.

The readily-dispersible processed products were then weighed in amounts of 14.0 parts (the processed yellow product), 12.4 parts (the processed blue product), 18.3 parts (the processed red product) and 18.3 parts (the processed black product), respectively, to which a charge control agent (2.8 parts) and bisphenol polyester resin powder were added to give 100 parts. After the resulting mixture was kneaded by an extruder, cooled and coarsely ground by usual methods, the mixture was finely ground by a jet mill and then classified to obtain a fine powder having an average particle size of from 7 to 8 μm. A fluidizing agent was added to the fine powder, followed by the mixing with a magnetic iron powder as a carrier to obtain a full-color dry developer of four colors for electrophotography. Development was performed by a full-color copying machine to obtain a full-color image of vivid 4 colors.

This application claims priority of Japanese Patent Application 2001-196893 filed Jun. 28, 2001, which is incorporated herein by reference.

What is claimed is:

1. A finely divided pigment, comprising:
   an aggregate of primary particles;
   wherein a number of primary particles of not greater than 0.1 μm in particle size is at least 95% of an entire number of said primary particles;
   wherein a number of primary particles of greater than 0.1 μm in particle size is at most 5% of said entire number of said primary particles; and
   wherein a number of primary particles of smaller than 0.02 μm in particle size is at most 10% of said entire number of said primary particles.

2. A finely divided pigment according to claim 1, wherein said pigment is selected from the group consisting of soluble or insoluble azo pigments, high molecular azo pigments, quinacridone pigments, anthraquinone pigments, diketopyrrolopyrrole pigments, quinophthalone pigments, methine/azomethine pigments, phthalocyanine pigments, perylene pigments, perinone pigments, isoindolinone pigments and metal complex pigments.

3. A process for producing a finely divided pigment according to claim 1, comprising:
   grinding a parent pigment together with a water-soluble inorganic salt and a water-soluble organic solvent in a grinding machine at a temperature of from 30 to 90° C. for 2 to 6 hours under a load, and then removing said water-soluble inorganic salt and said water-soluble organic solvent.

4. The process according to claim 3, wherein said parent pigment comprises particles of from 0.1 to 0.8 μm in primary particle size.

5. The process according to claim 3, wherein said water-soluble inorganic salt is at least one salt selected from the group consisting of sodium chloride and sodium sulfate, and wherein said water-soluble organic solvent is at least one solvent selected from the group consisting of ethylene glycol, diethylene glycol and polyethylene glycol.

6. A coloring compositions comprising:
   a dispersing medium; and
   a finely divided pigment according to claim 1 dispersed in said dispersing medium.

7. The coloring composition according to claim 6, wherein said dispersed pigment has an average particle size of not greater than 0.2 μm.

8. An ink, a paint, a textile printing agent containing a pigment, a fiber-coloring material, a plastic-coloring material, image recording material or image displaying material, comprising:
   the coloring composition according to claim 6.

9. The coloring composition according to claim 6, which is an image recording agent for an ink-jet recording system, an image recording agent for an electronic printing or electrostatic recording system, or a coloring agent for forming color filter pixels.

10. A process for coloring an article, which comprises:
    contacting an article with the coloring composition according to claim 6.

11. A process for manufacturing a color filter, which comprises:
    forming a color pattern of color filter pixels on a color filter substrate by contacting the color filter substrate with the coloring agent according to claim 9.

12. A colored article colored by the process according to claim 10.

13. A color filter manufactured by the process according to claim 11.

* * * * *